(12) United States Patent
Ryou et al.

(10) Patent No.: US 8,350,676 B2
(45) Date of Patent: Jan. 8, 2013

(54) SYSTEM AND METHOD FOR ALLOWING MULTIPLE RFID READER DEVICES TO READ RFID TAGS WITHOUT COLLISION

(75) Inventors: Byung Hoon Ryou, Seoul (KR); Won Mo Sung, Siheung-si (KR); You Ho Kim, Suwon-si (KR); Seung Up Seo, Suwon-si (KR); Young Soo Jang, Bucheon-si (KR); Ha Sun Na, Suwon-si (KR); Bong Suk Choi, Seoul (KR)

(73) Assignee: EMW Co., Ltd., Incheon (KR)

( * ) Notice: Subject to any disclaimer, the term of this patent is extended or adjusted under 35 U.S.C. 154(b) by 482 days.

(21) Appl. No.: 12/678,488

(22) PCT Filed: Sep. 12, 2008

(86) PCT No.: PCT/KR2008/005377
§ 371 (c)(1),
(2), (4) Date: Mar. 16, 2010

(87) PCT Pub. No.: WO2009/038309
PCT Pub. Date: Mar. 26, 2009

(65) Prior Publication Data
US 2010/0201494 A1     Aug. 12, 2010

(30) Foreign Application Priority Data

Sep. 18, 2007    (KR) .................. 10-2007-0094645

(51) Int. Cl.
*H04Q 5/22* (2006.01)
*H04B 7/00* (2006.01)
*H04W 4/00* (2009.01)
*H04B 7/212* (2006.01)

(52) U.S. Cl. ....... 340/10.2; 455/447; 455/450; 455/451; 455/453; 455/464; 455/509; 455/510; 455/511; 455/512; 455/513; 455/514; 455/515; 370/329; 370/330; 370/331; 370/332; 370/333; 370/334; 370/335; 370/336; 370/337; 370/338

(58) Field of Classification Search ................ 340/10.2; 455/447, 450–453, 464, 509–515; 370/329–338
See application file for complete search history.

(56) References Cited

U.S. PATENT DOCUMENTS 7,511,604 B2 *  3/2009  Raphaeli et al. ............. 340/10.2
(Continued)

FOREIGN PATENT DOCUMENTS

EP         1 804 191          7/2007
(Continued)

OTHER PUBLICATIONS

PCT International Search Report for PCT Counterpart Application No. PCT/KR2008/005377 containing Communication relating to the Results of the Partial International Search Report, 2 pgs., (Mar. 17, 2009).

(Continued)

*Primary Examiner* — Daniel Wu
*Assistant Examiner* — Kam Ma
(74) *Attorney, Agent, or Firm* — The PL Law Group, PLLC

(57) ABSTRACT

Provided are an RFID operating system and an RFID system operating method for allowing multiple RFID readers to read tags without collision. The RFID system operating method includes the steps of grouping RFID readers spaced apart by more than a spacing distance capable of avoiding collision between RFID readers into a single group to determine at least one group, classifying RPM readers included in each group into at least one sub-group based on a read time of each RFID reader, and driving the RFID readers such that RPM readers belonging to at least two different sub-groups that do not collide with each other simultaneously operate. According to the present invention, switching is performed sub-group by sub-group to reduce the number of switching operations and sub-groups can simultaneously operate to decrease a read time.

11 Claims, 5 Drawing Sheets

U.S. PATENT DOCUMENTS

| | | | |
|---|---|---|---|
| 7,567,179 B2* | 7/2009 | Stephensen et al. | 340/572.1 |
| 7,817,014 B2* | 10/2010 | Krishna et al. | 340/10.4 |
| 7,893,836 B2* | 2/2011 | Chung et al. | 340/572.1 |
| 7,898,391 B2* | 3/2011 | Maguire et al. | 340/10.2 |
| 8,066,181 B2* | 11/2011 | Bishop et al. | 235/380 |
| 8,098,135 B2* | 1/2012 | Powell | 340/10.2 |
| 2002/0175805 A9* | 11/2002 | Armstrong et al. | 340/10.31 |
| 2004/0257204 A1* | 12/2004 | Liao et al. | 340/10.2 |
| 2005/0088284 A1* | 4/2005 | Zai et al. | 340/10.2 |
| 2005/0093679 A1* | 5/2005 | Zai et al. | 340/10.2 |
| 2006/0022815 A1* | 2/2006 | Fischer et al. | 340/505 |
| 2007/0001813 A1* | 1/2007 | Maguire et al. | 340/10.2 |
| 2007/0018793 A1* | 1/2007 | Stewart et al. | 340/10.3 |
| 2007/0109099 A1* | 5/2007 | Raphaeli et al. | 340/10.2 |
| 2007/0139163 A1* | 6/2007 | Powell et al. | 340/10.2 |
| 2007/0159302 A1* | 7/2007 | Park | 340/10.2 |
| 2007/0229226 A1* | 10/2007 | Soleimani et al. | 340/10.2 |
| 2008/0100447 A1* | 5/2008 | Powell | 340/572.2 |
| 2008/0143485 A1* | 6/2008 | Frerking | 340/10.1 |
| 2010/0141392 A1* | 6/2010 | Jo et al. | 340/10.2 |
| 2010/0201494 A1* | 8/2010 | Ryou et al. | 340/10.2 |

FOREIGN PATENT DOCUMENTS

WO    WO 2004/095350    11/2004

OTHER PUBLICATIONS

Shijie Zhou, et al., "Interconnected RFID Reader Collision Model and its Application in Reader Anti-collision", 2007 IEEE International Conference on RFID, pp. 212-219, (Mar. 26-28, 2007).

* cited by examiner

SYSTEM AND METHOD FOR ALLOWING MULTIPLE RFID READER DEVICES TO READ RFID TAGS WITHOUT COLLISION

CROSS-REFERENCE TO RELATED APPLICATIONS

This patent application is a U.S. National Phase application under 35 U.S.C. §371 of International Application No. PCT/KR2008/005377, filed Sep. 12, 2008, entitled SYSTEM AND METHOD FOR ALLOWING MULTIPLE RFID READER DEVICES TO READ RFID TAGS WITHOUT COLLISION, which claims priority to Korean patent application number 10-2007-0094645, filed Sep. 18, 2007.

TECHNICAL FIELD

The present invention relates to a radio frequency identification (RFID) operating system and an RFID system operating method, and more particularly, to an RFID system for allowing multiple RFID readers to read RFID tags without collision and an RFID system operating method.

BACKGROUND ART

RFID systems have been actively studied recently. FIG. 1 is a block diagram of a conventional RFID system. The RFID system includes a transponder 10 which is also referred to as an RF tag, an antenna 20 for transmitting/receiving RF signals to/from the transponder 10, and a reader (and/or a writer) 30 for processing signals transmitted/received to/from the antenna 20. The reader 30 is connected to a host 40 for transmitting/receiving signals to/from at least one reader and processing the signals. The host 40 can be connected to the reader 30 through middleware (not shown). In this case, the middleware operates and controls the reader 30. Furthermore, the middleware can collect, arrange and filter data.

The transponder 10 is attached to a to-be-identified object such as a product, an automobile, the human body, an animal or the like and stores data such as identification information and state information of the object. The reader 30 transmits electromagnetic waves through the antenna 20 to activate the transponder 10 and reads data stored in the transponder or records new data in the transponder 10. Data is collected by the host 40 and processed into a required format.

The RFID system can continuously recognize the object and easily confirm whether the object is located in the coverage of the antenna 20, and thus attempts to apply the RFID system to various fields, such as distribution systems, parking control systems, hospitals and so on, have been made.

Since a general RFID system is applied to a wide area, only a single reader cannot cover the whole area and multiple readers operate together. However, when more than two readers simultaneously read a single tag, the tag receives read signals from all the readers and cannot appropriately respond to any reader, and thus all the readers fail in reading the tag.

To solve this collision between readers, a method of sequentially switching multiple readers to avoid a simultaneous operation is used. When a system includes N readers, for example, the N readers can be sequentially operated to avoid collision between readers. In this case, if a minimum read time of each reader is Ti, at least a time $$\sum_{i=1}^{N} T_i$$

is required to finish the reading operations of all the readers. That is, a very long time is required for the reading operations of the readers. Furthermore, (N-1) switching operations are required for the sequential operations to result in an increase in a system load. Particularly, when readers are connected to a network, switching of the readers accompanies switching of network connection for data communication, and thus the system load further increases.

SUMMARY

Accordingly, the present invention has been made to solve the above-mentioned problems occurring in the conventional art, and a primary object of the present invention is to provide an RFID system capable of operating multiple readers without collision between readers with a minimum number of switching operations within a minimum read time and an RFID system operating method.

To accomplish the object of the present invention, according to an aspect of the present invention, there is provided a method of operating an RFID (Radio Frequency Identification) system including multiple RFID readers, which comprises the steps of grouping RFID readers spaced apart by more than a spacing distance capable of avoiding collision between RFID readers into a single group to determine at least one group, classifying RFID readers included in each group into at least one sub-group based on a read time of each RFID reader, and driving the RFID readers such that RFID readers belonging to at least two different sub-groups that do not collide with each other simultaneously operate.

The step of determining the at least one group may comprise the steps of selecting a reference RFID reader, selecting an RFID reader spaced apart from the reference reader by more than the spacing distance, and excluding the selected RFID reader from the corresponding group when a distance between the selected RFID reader and an RFID reader included in the group other than the reference RFID reader is shorter than the spacing distance.

The step of determining the group may comprise the step of determining a distance between the RFID readers based on the coordinates of the RFID readers. The spacing distance may be determined based on readable distances of the RFID readers.

The step of driving the RFID readers may comprise the steps of allowing RFID readers belonging to a first group to start to operate, detecting a first sub-group that finishes the operation thereof among sub-groups included in the first group, determining a second sub-group which belongs to a second group different from the first group and includes RFID readers that collide with RFID readers belonging to the first sub-group, and allowing the RFID readers belonging to the second sub-group to operate after the RFID readers belonging to the first sub-group finish the operations thereof.

The step of determining the second sub-group may be performed based on known data representing collision between sub-groups.

According to another aspect of the present invention, there is provided a computer readable recording medium storing a program for executing the above-described method.

According to another aspect of the present invention, there is provided a system of operating an RFID system including multiple RFID readers, which comprises a grouping unit grouping RFID readers spaced apart by more than a spacing distance capable of avoiding collision between RFID readers into a single group to determine at least one group, a classification unit classifying RFID readers included in each group into at least one sub-group based on a read time of each RFID reader, and a driving unit driving the RFID readers such that RFID readers belonging to at least two different sub-groups that do not collide with each other simultaneously operate.

The grouping unit may select an RFID reader spaced apart from a predetermined reference reader by more than the spacing distance and exclude the selected RFID reader from the corresponding group when a distance between the selected RFID reader and an RFID reader included in the group other than the reference RFID reader is shorter than the spacing distance. The grouping unit may determine a distance between the RFID readers based on the coordinates of the RFID readers.

The spacing distance may be determined based on readable distances of the RFID readers.

The system may further comprise an identification unit detecting a first sub-group that finishes the operation thereof among sub-groups included in a first group and providing the detection result to the driving unit, wherein the driving unit determines a second sub-group which belongs to a second group different from the first group and includes RFID readers that collide with RFID readers belonging to the first sub-group and allows the RFID readers belonging to the second sub-group to operate after the RFID readers belonging to the first sub-group finish the operations thereof.

The second sub-group may be determined based on known data representing collision between sub-groups.

According to the present invention, multiple readers can simultaneously operate without collision between readers with a minimum number of switching operations within a minimum read time.

BRIEF DESCRIPTION OF THE DRAWINGS

Further objects and advantages of the invention can be more fully understood from the following detailed description taken in conjunction with the accompanying drawings, in which.

DETAILED DESCRIPTION

The present invention will now be described more fully with reference to the accompanying drawings, in which exemplary embodiments of the invention are shown. However, the present invention is not limited to the embodiments. In the following description, "transmission", "communication" and "reception" of a signal or information and other similar terms include not only direct transmission from a component to another component but also transmission via another component. Particularly, "transmission" or "sending" of a signal or information to a component designates the final destination of the signal or information and does not mean a direct destination. This is the same in "reception" of a signal or information. Furthermore, in this specification, more than two data or information items are "related" means that, when one of the data (or information) item is acquired, at least part of the other data (or information) item can be obtained.

Figure 1:
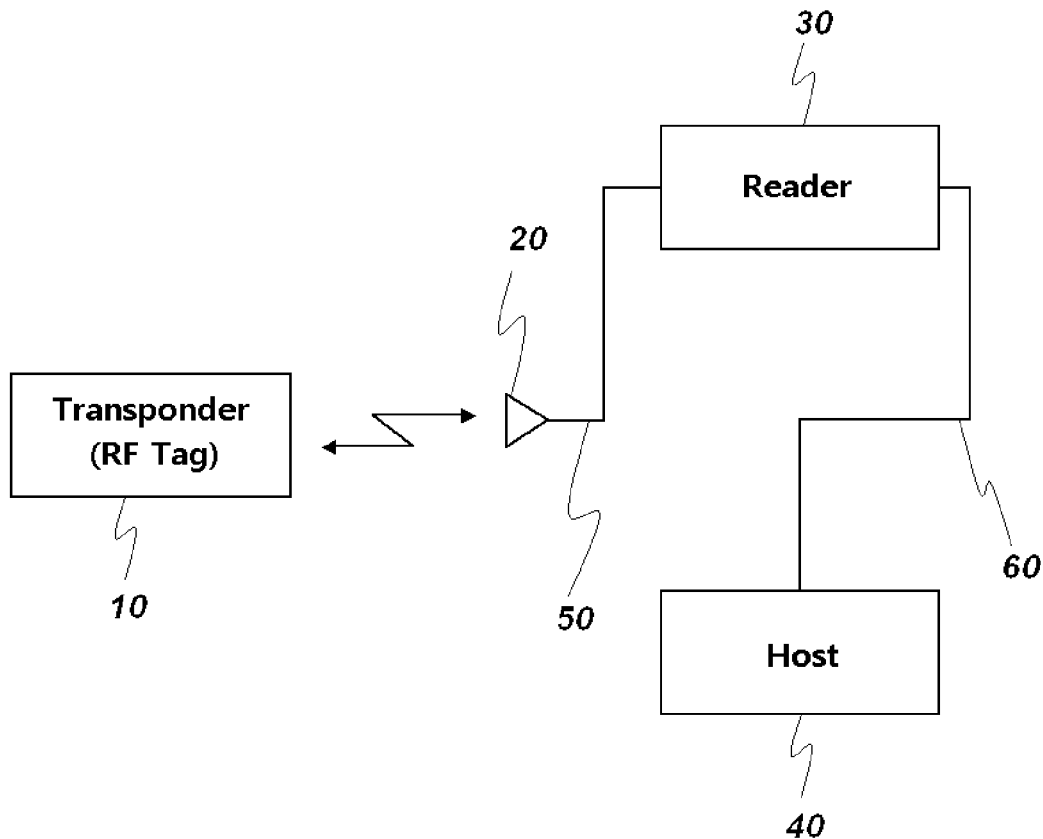
FIG. 1 is a block diagram of a conventional RFID system.
Figure 2:
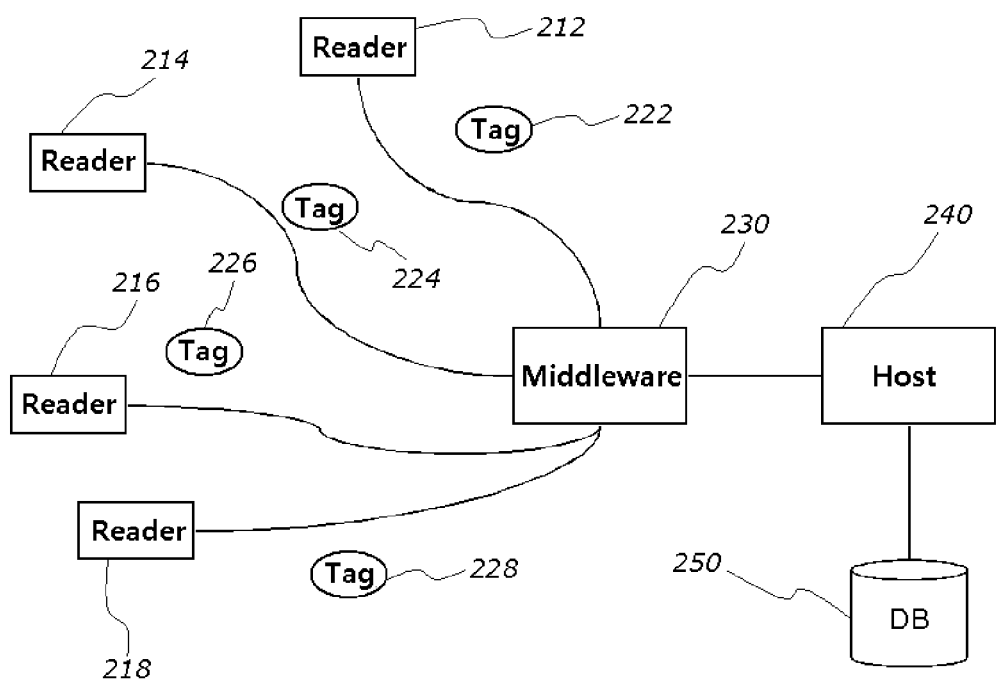
FIG. 2 illustrates a configuration of an RFID system according to an embodiment of the present invention.

FIG. 2 illustrates a configuration of an RFID system according to an embodiment of the present invention. The RFID system according to the present embodiment of the invention includes multiple RFID readers 212, 214, 216 and 218 arranged to respectively read multiple RFID tags 222, 224, 226 and 228. The RFID readers 212, 214, 216 and 218 have respective recognition distances and read the RFID tags 222, 224, 226 and 228. The recognition distances are determined according to the performance of the readers, a tag type, a communication protocol used for RFID, a frequency band used for RFID and so on and a system designer must know the recognition distances.

The readers 212, 214, 216 and 218 are connected to middleware 230 and controlled by the middleware 230. The middleware 230 receive information on the readers 212, 214, 216 and 218 and controls the readers 212, 214, 216 and 218 to operate without collision based on the received information. In addition, the middleware 230 can convert data read by the readers 212, 214, 216 and 218 into a form suitable for being transmitted to a host 240. Particularly, the middleware 230 performs a predetermined method which will be described later to schedule and control the operations of the readers 212, 214, 216 and 218. Although the middleware 230 can be configured in the form of a single computer, the middleware 230 can be implemented by multiple computers and include various network equipments such as a switch, a router and so on when the RFID system is very large.

The host 240 receives data from the middleware 230 and processes the data to serve the purpose of the system. In a storehouse management system, for example, the host 240 can create a list of goods existing in a storehouse and compare data according to time to determine stock state and required supplementary goods. Furthermore, the data processed by the host 240 can be stored in a database 250 and managed. The database 250 can store information on the positions and types of the readers 212, 214, 216 and 218 in addition to data with respect to goods.

In the system constructed as above, an RFID system operating method performed by the RFID system, particularly, the middleware 230, is explained.

Figure 3:
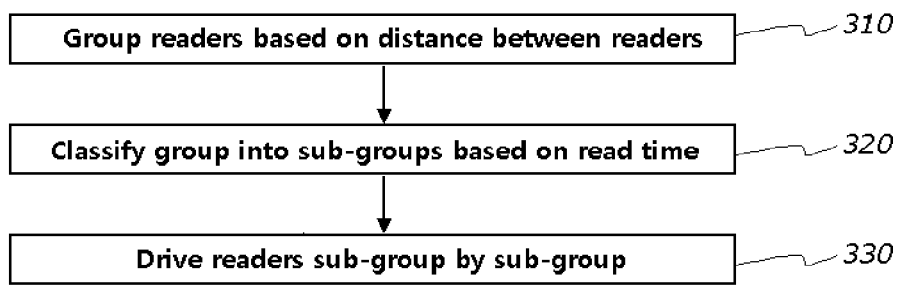
FIG. 3 is a flow chart illustrating an RFID system operating method according to an embodiment of the present invention.

FIG. 3 is a flow chart illustrating an RFID system operating method according to an embodiment of the present invention. The RFID system operating method according to the present embodiment of the invention groups RFID readers at a distance of more than a spacing distance that avoids collision between RFID readers into a single group to determine at least one group in a step 310. Accordingly, readers belonging to the same group can operate together without collision. The spacing distance serving as a basis of grouping can be based on the recognition distances of the RFID readers and be determined according to a protocol used in the RFID system. For example, twice a recognition distance of a reader is determined as the spacing distance when GEN2 standard is used.

RFID readers belonging to each group are classified into at least one sub-group based on a read time in a step 320. As described above, the RFID readers have respective recognition distances and different positions. Accordingly, the respective readers may read different numbers of tags. Furthermore, the respective readers have different processing speeds due to their circuit configurations or processor performances and environmental conditions such as temperature, humidity and radio waves, and thus the readers require different time periods to read the tags. The RFID readers included in the same group are classified into sub-groups based on the time periods required to read tags in the step 320.

The RFID readers are driven such that RFID readers belonging to at least two sub-groups, which do not collide with each other, simultaneously operate in a step 330. While RFID readers belonging to the same group can operate without collision, there is no guarantee that RFID readers belonging to different groups will operate without collision. However, a combination of RFID readers that can operate without collision even though they belong to different groups may exist. The step 330 simultaneously drives RFID readers that can operate without collision even though they belong to different groups to reduce a read time and the number of switching operations. Particularly, it is determined whether collision occurs sub-group by sub-group in the step 330, and thus multiple readers can simultaneously operate to remarkably decrease the read time as described later.

Figure 4:
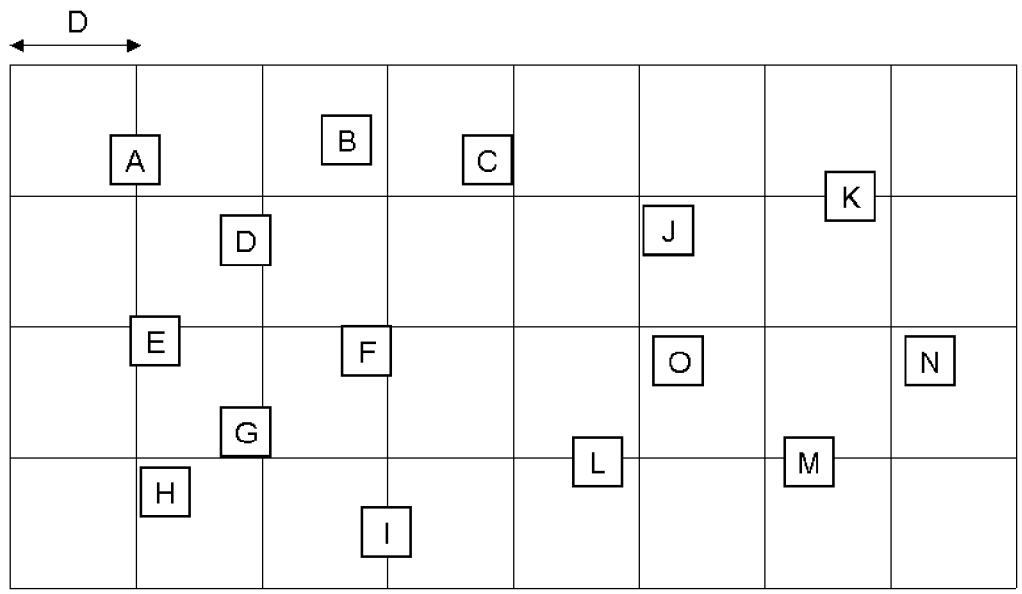
FIG. 4 illustrates exemplary arrangement of RFID readers.

FIG. 4 illustrates exemplary arrangement of RFID readers. The RFID system operating method will now be explained in more detail using the arrangement of RFID readers illustrated in FIG. 4. In FIG. 4, grating represents a spacing distance for preventing collision of RFID readers, that is, a spacing distance corresponding to a basis of grouping.

Figure 5:
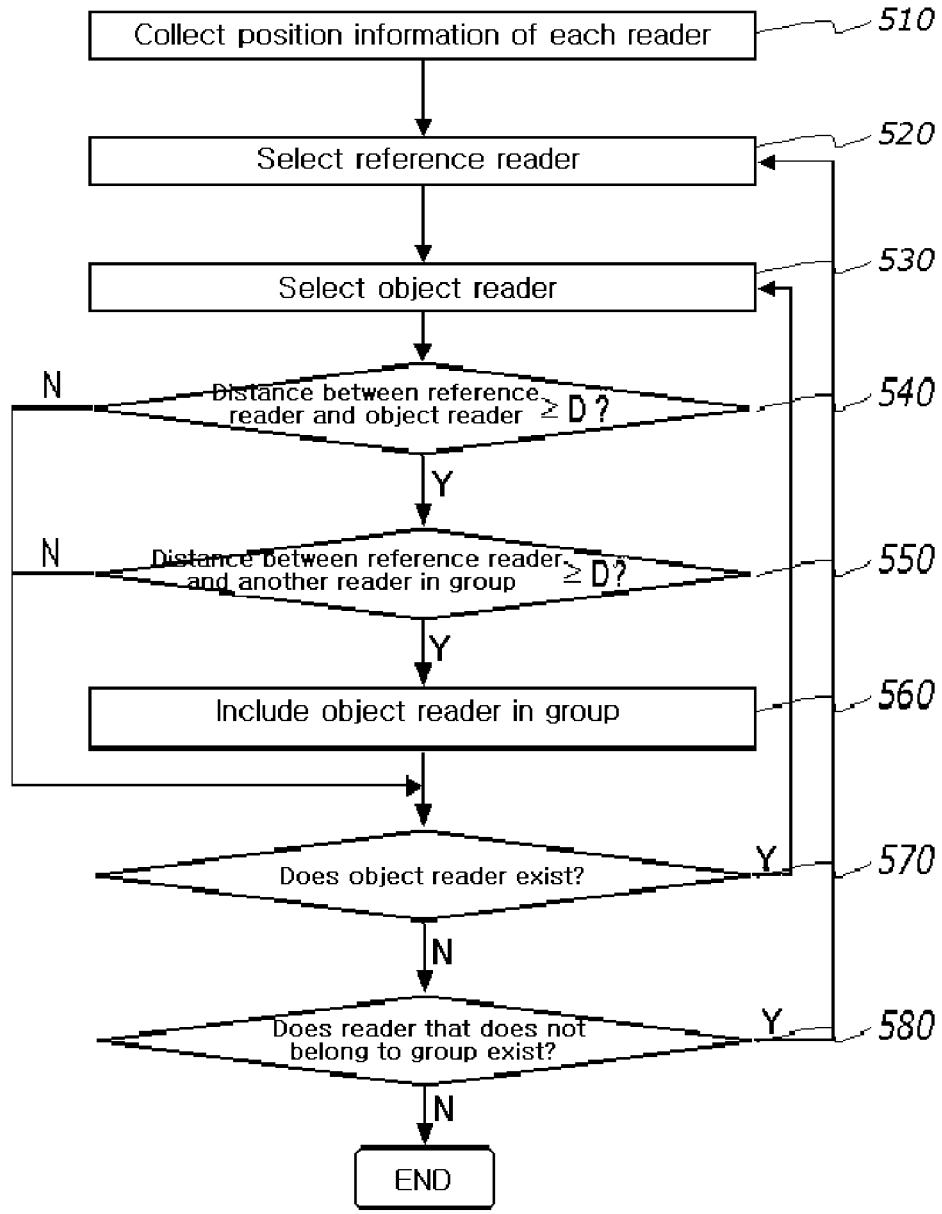
FIG. 5 is a flow chart illustrating a grouping method according to an embodiment of the present invention.

The step of grouping RFID readers (310 of FIG. 3) is explained in detail with reference to FIG. 5. First of all, position information of multiple RFID readers is collected in a step 510. Although the position information may be information on a distance between RFID readers, the position information corresponds to the coordinates of the RFID readers in the present embodiment of the invention. The collected coordinates of the readers are used to determine a distance between RFID readers.

A reference reader is selected from the multiple readers in a step 520. The reference reader is simply selected in order to perform following steps for the sake of convenience, and thus there is no need to select the reference reader according to a special requirement. If a reader A illustrated in FIG. 4 is selected as the reference reader, for example, one of readers other than the reference reader A, for example, a reader B, is selected as an object reader in a step 530 and it is determined whether a distance between the reference reader A and the object reader B exceeds a predetermined spacing distance D in a step 540.

When the distance between the reference reader A and the object reader B exceeds the spacing distance D, as illustrated in FIG. 4, a distance between the object reader B and another reader in the group is compared to the spacing distance D in a step 550. When there is no other reader in the group, the step 550 is passed. The step 550 can be implemented by an algorithm that is constructed such that the distance becomes infinity when there is no object of comparison. When the reader B passes the steps 540 and 550, the reader B belongs to the group including the reader A in a step 560.

It is determined whether there is a more reader that can be the object reader in a step 570 and the process returns to the step 530 when there is a more reader. For example, a reader C is selected as the object reader and a distance between the reference reader A and the object reader C is compared to the spacing distance D in the step 540. The reader C is located apart from the reference reader A by more than the spacing distance D, and thus the reader C passes the step 540. However, since a distance between the readers B and C is shorter than the spacing distance D, the reader C cannot pass the step 550 and the operation goes to the step 570 to determine whether there is a more reader that can be the object reader.

Where there is a more reader to be the object reader, the aforementioned process is repeated and thus readers A, B, E, F, I, J, L and N belong to the same group in the present embodiment of the invention. Where there is no object reader in the step 570, it is determined whether there is a reader that does not belong to the group in a step 580. When there is a reader that does not belong to the group, the process returns to the step 530 to select a reference reader and continuously perform the grouping operation. Here, the reference reader must be selected from readers that do not belong to the group.

According to the aforementioned process, following three reader groups are obtained in the present embodiment of the invention.

Group 1: A, B, E, F, I, J, L, N
Group 2: C, G, M
Group 3: D, K, H, O

Figure 6:
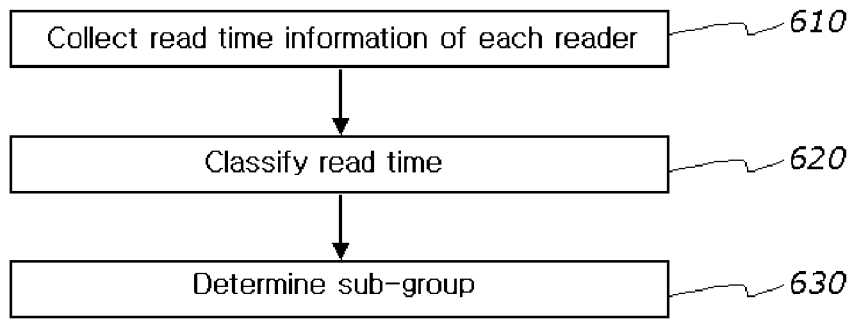
FIG. 6 is a flow chart illustrating a classification method according to an embodiment of the present invention.

The sub-group classification operation (step 320 of FIG. 3) will now be explained in detail with reference to FIG. 6. Information on the read time of each of readers belonging to the same group is collected in a step 610. This information can be obtained by operating the readers by way of trial or acquired from a database. For example, the read time of each of the readers in the group 1, obtained in the step 610, is as follows.

Reader A: 4 seconds
Reader B: 1 second
Reader E: 4 seconds
Reader F: 0.1 seconds (100 ms)
Reader I: 1 second
Reader J: 1 second
Reader L: 100 ms
Reader N: 4 seconds The read time is classified based on the obtained information to determine the number of sub-groups in a step 620. There are three read time periods, 4 seconds, 1 second and 0.1 seconds, in the present embodiment of the invention, and thus three sub-groups can be acquired. However, readers are not classified as the same sub-group only when the readers have the exact same read time and the readers can be classified as the same sub-group even though there is an allowable difference between the read time periods of the readers according to system characteristics. The readers are classified into sub-groups in a step 630 based on the three read time periods as follows.

Group 1-1: F, L
Group 1-2: B, I, J
Group 1-3: A, E, N

The steps 620 and 630 can be simultaneously performed. That is, the aforementioned sub-groups can be obtained only by classifying the readers according to their read time periods without additionally classifying the read time periods.

It is assumed that the group 2 is classified into sub-groups 2-1, 2-2 and 2-3 and the group 3 is classified into sub-groups 3-1 and 3-2 according to the aforementioned operation for convenience of explanation.

Figure 7:
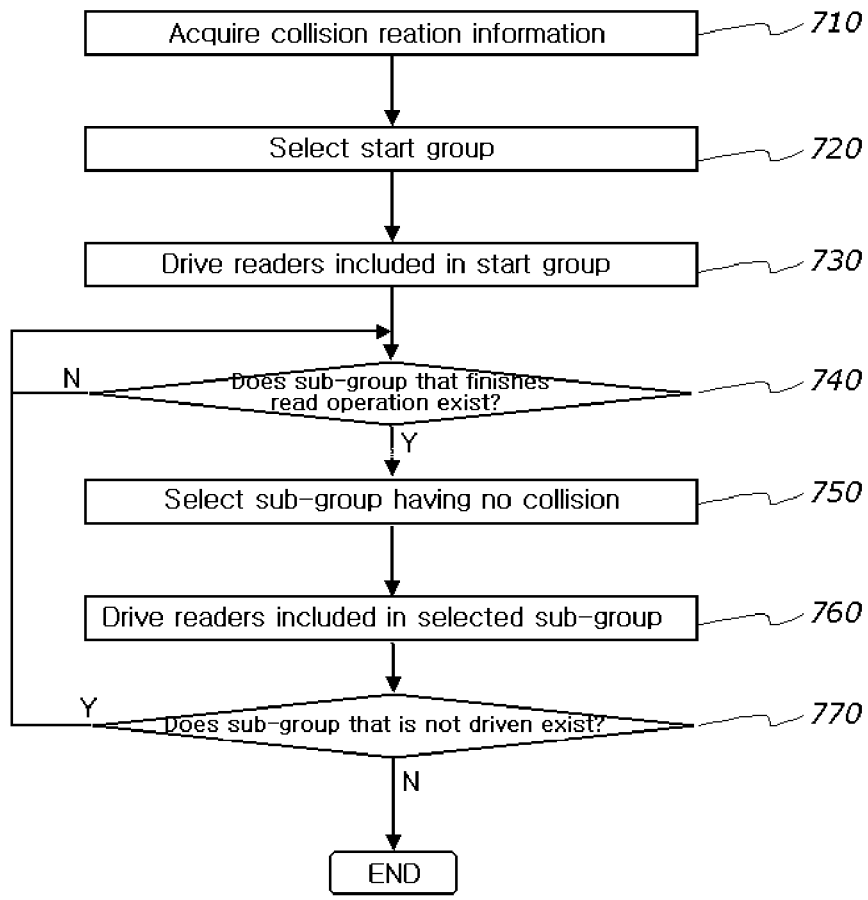
FIG. 7 is a flow chart illustrating a driving method according to an embodiment of the present invention.

The method of driving the classified sub-groups (step 330 of FIG. 3) will now be explained in detail with reference to FIG. 7. Although the following description is made from the standpoint of the driving method, the point of the description is to determine an order of driving sub-groups and the driving method can be applied to a scheduling method in the same manner. For example, when "driving" is substituted by "scheduling to drive" in the following description, the method described below can be easily converted to a scheduling method. Accordingly, "driving" includes scheduling in this specification and claims.

The driving method acquires information on collision between sub-groups in a step 710. As described above, readers in different groups may collide with each other while readers in the same group do not collide with each other. However, when the readers are classified into sub-groups, sub-groups that do not collide with each other may exist even though the sub-groups are different groups. The step 710 acquires information on this collision relation among sub-groups. While the information can be obtained by driving readers of each sub-group to confirm whether collision occurs, it is preferable to acquire the collision information using information previously stored in the database. It is assumed that collision between sub-groups occurs in the aforementioned example as follows.

sub-group among the first selected sub-groups. In the above-described example, when the completion of the reading operation of the sub-group 1-1 is detected, sub-groups 2-1, 2-2, 2-3, 3-1 and 3-2 which collide with the sub-group 1-1 are selected, and then a sub-group that does not collide with both the currently operating sub-groups 1-2 and 1-3 is selected. Accordingly, the sub-groups 2-1 and 2-2 are selected. Readers included in the selected sub-group are operated to start to read tags in a step 760. This operation is repeated until all the sub-groups are operated in a step 770.

Figure 8:
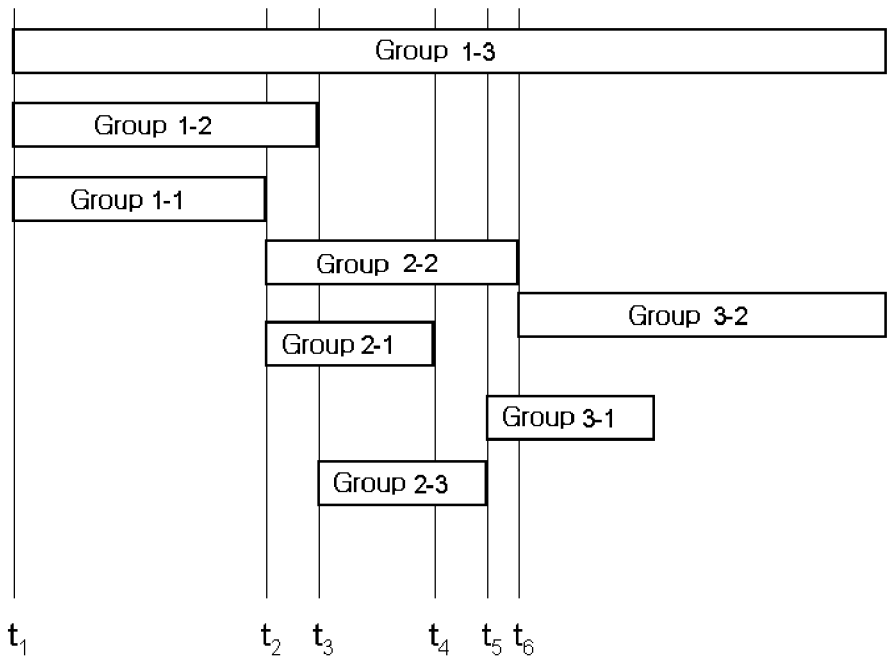
FIG. 8 illustrates exemplary RFID reader operating timing.

FIG. 8 illustrates exemplary operating timing of readers operated in the aforementioned manner. As described above, the group 1 is selected as the start group and operated at t1. When the sub-group 1-1 finishes the reading operation, the sub-groups 2-1 and 2-2 which collide with the sub-group 1-1 and do not collide with the sub-groups 1-2 and 1-3 start to operate at t2. Then, the sub-group 1-2 finishes the reading operation and the sub-group 2-3 that does not collide with the

|           | Group 1-1 | Group 1-2 | Group 1-3 | Group 2-1 | Group 2-2 | Group 2-3 | Group 3-1 | Group 3-2 |
|-----------|-----------|-----------|-----------|-----------|-----------|-----------|-----------|-----------|
| Group 1-1 | —         | X         | X         | O         | O         | O         | O         | O         |
| Group 1-2 | X         | —         | X         | X         | X         | O         | O         | O         |
| Group 1-3 | X         | X         | —         | X         | X         | X         | X         | X         |
| Group 2-1 | O         | X         | X         | —         | X         | X         | O         | O         |
| Group 2-2 | O         | X         | X         | X         | —         | X         | X         | O         |
| Group 2-3 | O         | O         | X         | X         | X         | —         | O         | X         |
| Group 3-1 | O         | O         | X         | O         | X         | O         | —         | X         |
| Group 3-2 | O         | O         | X         | O         | O         | X         | X         | —         |

In this table, X represents that collision does not occurs between sub-groups (that is, the sub-groups can simultaneously operate) and O represents that collision occurs between the sub-groups (that is, the sub-groups cannot simultaneously operate).

A start group is selected in a step 720. The start group is a group to be operated first among multiple groups and can be freely selected in consideration of various factors such as user's preference and system requirements. Readers included in the selected start group are all operated in a step 730. For example, the group 1 is selected as the start group and the readers A, B, E, F, I, J, L and N belonging to the group 1 start to operate. Then, the readers A, B, E, F, I, J, L and N of the group 1 start to read tags.

It is determined whether there is a sub-group that finishes the reading operation among the sub-groups in a step 740. In the aforementioned example, the group 1-1 finishes the reading operation first because the group 1-1 has the shortest read time corresponding to 0.1 seconds. When any sub-group that finishes the reading operation is not detected, the step 740 is repeated until a sub-group that finishes the reading operation is detected.

When a sub-group that finishes the reading operation is detected, a sub-group that does not collide with the currently operating sub-group is selected in a step 750. Here, it may be efficient to select sub-groups that collide with the sub-group that finishes the reading operation first and then select a sub-group that does not collide with the currently operating sub-groups 1-3, 2-1 and 202 among sub-groups colliding with the sub-group 1-2 starts to operate at t3.

The next sub-group that finishes the reading operation is the sub-group 2-1. However, a sub-group that does not collide with the sub-groups 1-3, 2-2 and 2-3 cannot be detected, and thus no sub-group starts to operate at t4. The sub-group 3-1 starts to read tags at t5 after the sub-group 2-3 finishes the reading operation, and the sub-group 3-2 starts to read tags at t6 after the sub-group 2-2 finishes reading tags. Accordingly, all the readers finish reading tags.

As described above, the multiple readers are classified into sub-groups according to their read time periods, scheduled and operated in consideration of collision among them, and thus sub-groups can simultaneously operate. For example, the sub-group 1-3 operates simultaneously with the other sub-groups, as illustrated in FIG. 8. Accordingly, the total read time of the whole readers becomes smaller than the sum of the read time periods of the respective readers to enable rapid tag reading without collision. Furthermore, switching is not performed reader by reader and is carried out sub-group by sub-group, and thus the number of switching operations can be reduced and a system load can be decreased. Accordingly, it is possible to rapidly grasp distribution circumstances and update data in real time.

Meantime, although it is preferable to execute the RFID system operating method on middleware, a host computer can directly execute the method. The aforementioned method can also be embodied as program instructions and recorded on a computer readable recording medium. The computer readable recording medium can store program instructions, data files and data structures in an independent or combining manner. The program instructions recorded on the computer readable recording medium can be specially designed and configured for the present invention or known to those of skilled in computer software. Examples of the computer readable recording medium include magnetic media such as hard disks, floppy disks and magnetic tapes, optical media such as CD-ROMs and DVDs, magneto-optical media such as floptical disks, and a hardware device specially constructed to store and execute program instructions, such as ROM, RAM and flash memory. Examples of the program instructions include high level language codes that can be executed by computers using an interpreter as well as machine language codes generated by a complier. The hardware device can be constructed such that the hardware device operates as at least one software module to perform the operation of the present invention, and vice versa.

Figure 9:
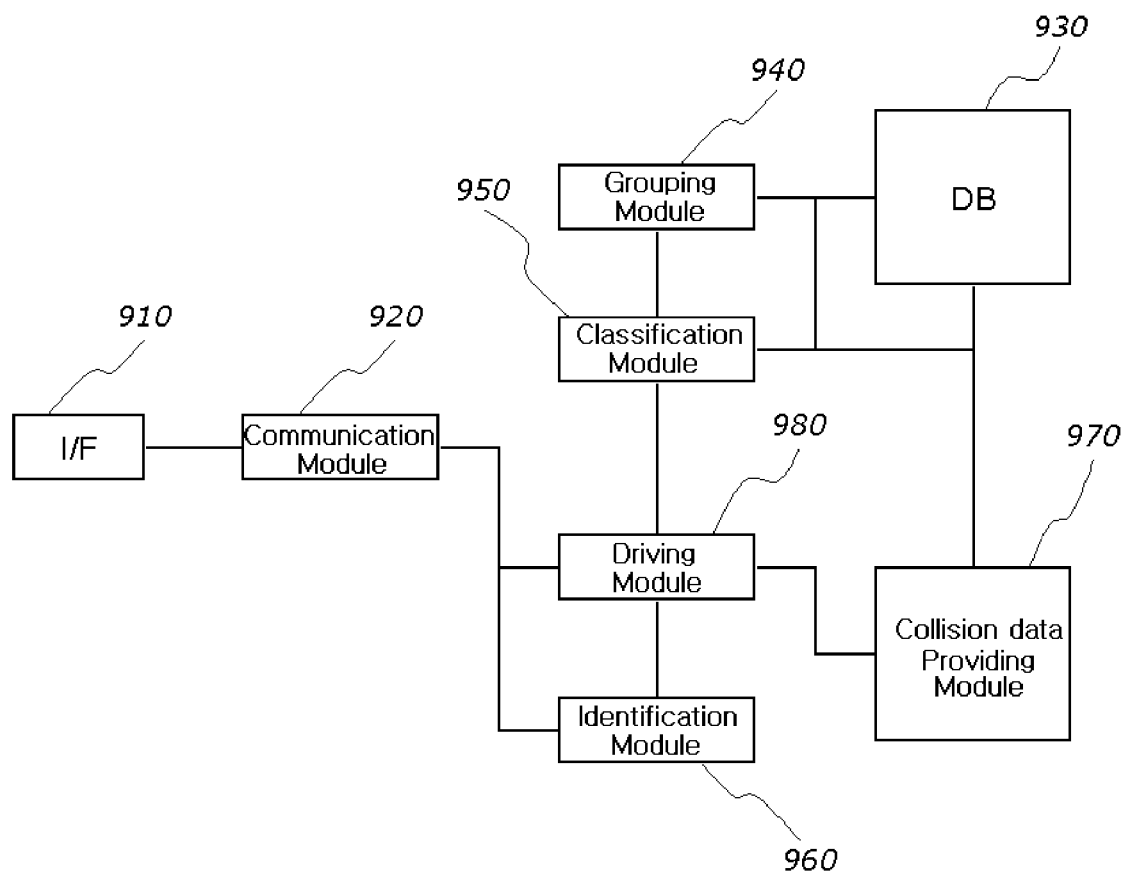
FIG. 9 is a block diagram of an RFID system according to another embodiment of the present invention.

An RFID system according to another embodiment of the present invention will now be explained with reference to FIG. 9. The RFID system in the present embodiment of the invention can be middleware or a host computer. Otherwise, the RFID system can be a system including RFID readers or a system included in the middleware or the host computer.

The RFID system includes an interface 910 connected to readers to manage communication and a communication module 920 for transmitting/receiving information to/from the readers through the interface 910. The communication module 920 is connected to a driving module 980 and an identification module 960 and transmits/receives signals required to control the readers. Specifically, the driving module 980 transmits a reader driving signal through the communication module 920 and the identification module 960 detects operating states of the readers and determines whether a reader that finishes a reading operation thereof exists through the communication module 920. The driving module 980 can communicate with the identification module 960 to start to drive at timing determined by the identification module 960.

Furthermore, the driving module 980 communicates with a grouping module 940 and a classification module 950. The grouping module 940 divides multiple readers into at least one group based on a distance between readers and the classification module 950 classifies each group into at least one sub-group based on the read time of each reader. Information on the distance between readers and information on the read time can be obtained from a database 930. Otherwise, it is possible to directly drive the readers through the driving module 980 to obtain the information on the distance between readers and the information on the read time.

The driving module 980 is also connected to a collision data providing module 970. The collision data providing module 970 provides information on collision between sub-groups in order to drive and/or schedule the sub-groups. The collision information can be obtained from the database 930 or by directly operating the readers through the driving module 980. Furthermore, the collision data providing module 970 can communicate with the classification module 950 to acquire information on classification of the sub-groups.

The operation of the RFID system constructed as above will now be explained.

The grouping module 940 acquires information on the coordinates of readers, stored in the database 930, and divides the readers into at least one group based on the information. The classification module 950 acquires information on the read time of each reader from the database 930 and classifies each group into at least one sub-group. The grouping module 940 and the classification module 950 provide the results to the driving module 980 and the identification module 960. The collision data providing module 970 acquires information on collision between sub-groups based on the information from the database 930 and the classification module 950 and provides the acquired information to the driving module 980.

The driving module 980 generates a driving signal based on group information from the grouping module 940 and sub-group information from the classification module 950 and drives the readers through the communication module 920. The identification module 960 detects sub-groups that finish reading operations while the readers being operated and provides information on the detected sub-groups to the driving module 980. The driving module 980 selects sub-groups having no collision based on the information received from the identification module 960 and drives the selected sub-groups.

According to the aforementioned configuration, the RFID system according to the present embodiment of the invention can simultaneously operate multiple RFID readers without collision to reduce a read time and the number of times of switching readers.

While this invention has been particularly shown and described with reference to preferred embodiments thereof, it will be understood by those skilled in the art that various changes in form and details may be made therein without departing from the spirit and scope of the invention as defined by the appended claims. Functional blocks described in the specification can be embodied by various known devices such as electronic circuits, integrated circuits and ASIC (Application Specific Integrated Circuit) and they can be respectively constructed or at least two of them can be integrated into one. Components described to be independent in the specification and claims are simply functionally distinguished and can be implemented as one means physically. A component described to be single can be configured by a combination of multiple components. Furthermore, the order of the steps of the methods described in the specification can be changed without departing from the scope of the present invention and another step can be added to the steps. Moreover, the various embodiments explained in the specification can be independently implemented or appropriately combined. Accordingly, the scope of the present invention should not be limited to the description of the embodiments, but defined by the accompanying claims and equivalents thereof.

What is claimed is:

1. A method of operating an RFID (Radio Frequency Identification) system including multiple RFID readers, comprising:

grouping RFID readers spaced apart by more than a spacing distance to avoid collision between RFID readers into a single group to determine at least one group;

classifying RFID readers included in each group into at least one sub-group based on a read time of each RFID reader; and driving the RFID readers such that RFID readers belonging to at least two different sub-groups that do not collide with each other simultaneously operate;

wherein driving the RFID readers comprises:

allowing RFID readers belonging to a first group to start to operate;

detecting a first sub-group that finishes the operation thereof among sub-groups included in the first group;

determining a second sub-group which belongs to a second group different from the first group and includes RFID readers that collide with RFID readers belonging to the first sub-group; and allowing the RFID readers belonging to the second sub-group to operate after the RFID readers belonging to the first sub-group finish the operations thereof.

2. The method according to claim 1, wherein determining the at least one group comprises:

selecting a reference RFID reader;

selecting an RFID reader spaced apart from the reference reader by more than the spacing distance; and excluding the selected RFID reader from the corresponding group when a distance between the selected RFID reader and an RFID reader included in the group other than the reference RFID reader is shorter than the spacing distance.

3. The method according to claim 1, wherein determining the group comprises determining a distance between the RFID readers based on the coordinates of the RFID readers.

4. The method according to claim 1, wherein the spacing distance is determined based on readable distances of the RFID readers.

5. The method according to claim 1, wherein determining the second sub-group is performed based on known data representing collision between subgroups.

6. A computer readable recording medium storing a program for executing a method of operating an RFID (Radio Frequency Identification) system including multiple RFID readers on a computer, comprising:

grouping RFID readers spaced apart by more than a spacing distance to avoid collision between RFID readers into a single group to determine at least one group;

classifying RFID readers included in each group into at least one sub-group based on a read time of each RFID reader; and driving the RFID readers such that RFID readers belonging to at least two different sub-groups that do not collide with each other simultaneously operate;

wherein driving the RFID readers comprises:

allowing RFID readers belonging to a first group to start to operate;

detecting a first sub-group that finishes the operation thereof among sub-groups included in the first group;

determining a second sub-group which belongs to a second group different from the first group and includes RFID readers that collide with RFID readers belonging to the first sub-group; and allowing the RFID readers belonging to the second sub-group to operate after the RFID readers belonging to the first sub-group finish the operations thereof.

7. A system of operating an RFID system including multiple RFID readers, comprising:

a grouping unit grouping RFID readers spaced apart by more than a spacing distance to avoid collision between RFID readers into a single group to determine at least one group;

a classification unit classifying RFID readers included in each group into at least one sub-group based on a read time of each RFID reader;

a driving unit driving the RFID readers such that RFID readers belonging to at least two different sub-groups that do not collide with each other simultaneously operate; and an identification unit detecting a first sub-group that finishes the operation thereof among sub-groups included in a first group and providing the detection result to the driving unit, wherein the driving unit determines a second sub-group which belongs to a second group different from the first group and includes RFID readers that collide with RFID readers belonging to the first sub-group and allows the RFID readers belonging to the second sub-group to operate after the RFID readers belonging to the first sub-group finish the operations thereof.

8. The system according to claim 7, wherein the grouping unit selects an RFID reader spaced apart from a predetermined reference reader by more than the spacing distance and excludes the selected RFID reader from the corresponding group when a distance between the selected RFID reader and an RFID reader included in the group other than the reference RFID reader is shorter than the spacing distance.

9. The system according to claim 7, wherein the grouping unit determines a distance between the RFID readers based on the coordinates of the RFID readers.

10. The system according to claim 7, wherein the spacing distance is determined based on readable distances of the RFID readers.

11. The system according to claim 7, wherein the second sub-group is determined based on known data representing collision between sub-groups.

* * * * *